R. DI FILIPPO.
REINFORCED CONCRETE BUILDING BLOCK.
APPLICATION FILED JAN. 14, 1915.

1,193,878.

Patented Aug. 8, 1916.
3 SHEETS—SHEET 1.

Witnesses:
E. G. McGee.
I. M. Hartig.

Inventor:
Roberto Di Filippo
By Emil Römelcke
Attorney.

R. DI FILIPPO.
REINFORCED CONCRETE BUILDING BLOCK.
APPLICATION FILED JAN. 14, 1915.

1,193,878.

Patented Aug. 8, 1916.
3 SHEETS—SHEET 2.

Witnesses:
E. G. McGee.
J. M. Hartig.

Inventor:
Roberto Di Filippo
By Emile Noiwel
Attorney.

R. DI FILIPPO.
REINFORCED CONCRETE BUILDING BLOCK.
APPLICATION FILED JAN. 14, 1915.

1,193,878.

Patented Aug. 8, 1916.
3 SHEETS—SHEET 3.

Witnesses:
E. G. McGee.
I. M. Hartig.

Inventor:
Roberto Di Filippo
By Emil Poimely
Attorney.

UNITED STATES PATENT OFFICE.

ROBERTO DI FILIPPO, OF SALERNO, ITALY.

REINFORCED-CONCRETE BUILDING-BLOCK.

1,193,878.   Specification of Letters Patent.   Patented Aug. 8, 1916.

Application filed January 14, 1915.   Serial No. 2,271.

*To all whom it may concern:*

Be it known that I, ROBERTO DI FILIPPO, a subject of the King of Italy, residing at Salerno, Italy, have invented certain new and useful Improvements in Reinforced-Concrete Building-Blocks, of which the following is a specification.

This invention relates to improvements in reinforced concrete building blocks.

The improved blocks are intended for constructing floors or roofings and can be readily laid whatever the type of the framework adopted may be (iron girders, reinforced concrete or wooden beams) with the maximum of economy, while furnishing absolutely sound-proof and coherent floors of greater strength.

In accordance with the present invention the floor is formed of reinforced concrete blocks of the same length as the distance between two contiguous girders or beams and of such shape as to enable them to bear firmly on the girders and to completely occupy the space comprised between the girders while leaving a large air chamber above the ceiling.

Figure 1:
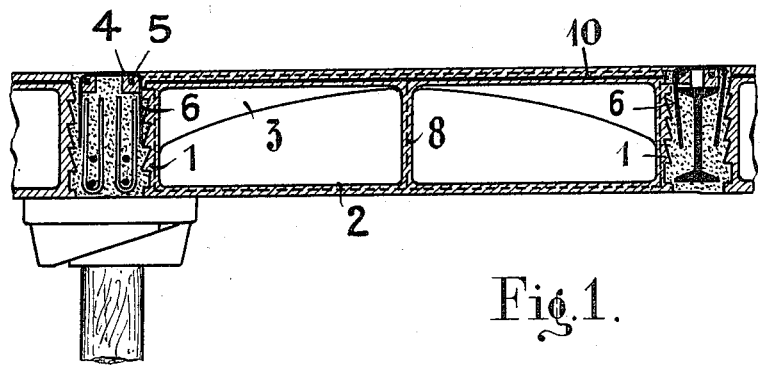
Figure 2:
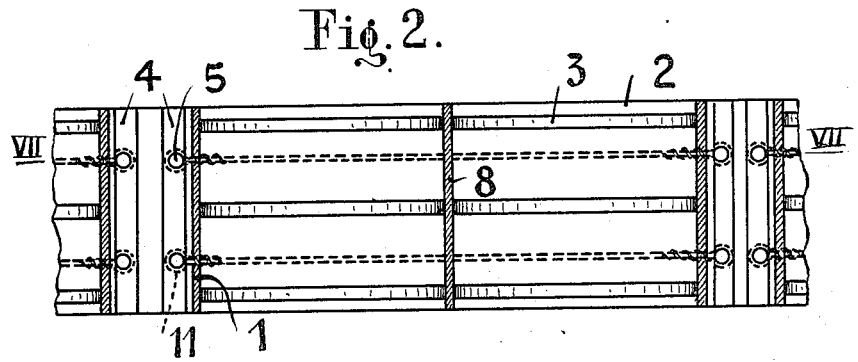
Figure 6:
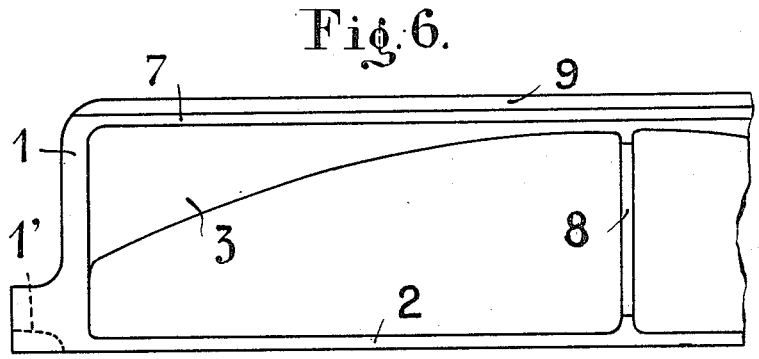
Figure 5:
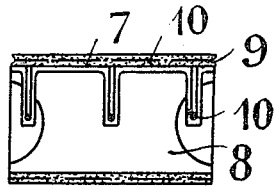
Figure 4:
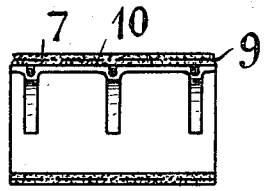
Figure 3:
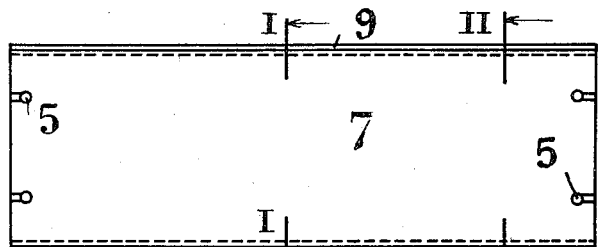
Figure 7:
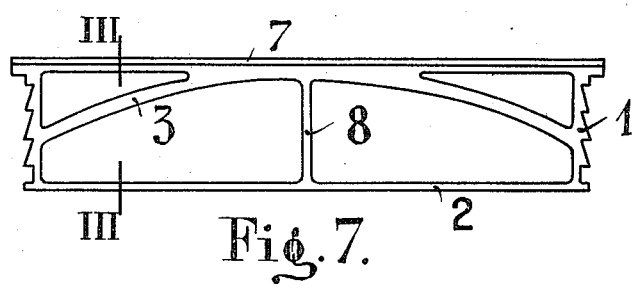
Figure 8:
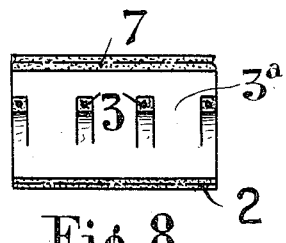
Figure 9:
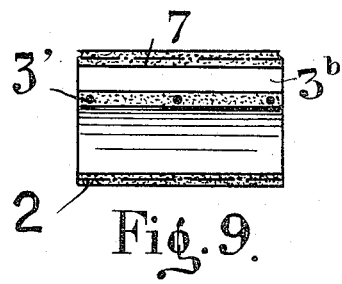
Figure 10:
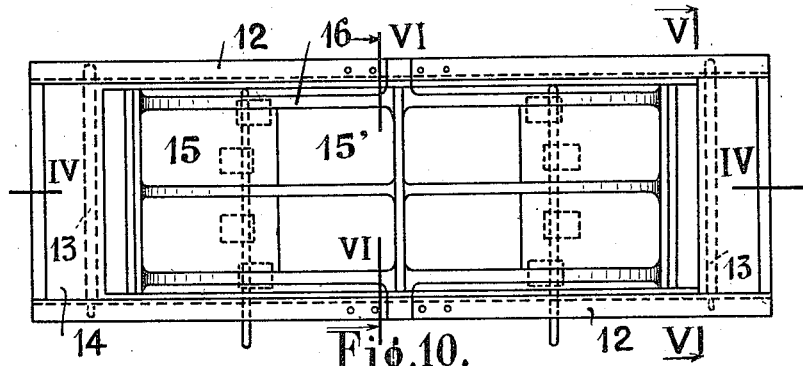
Figure 11:
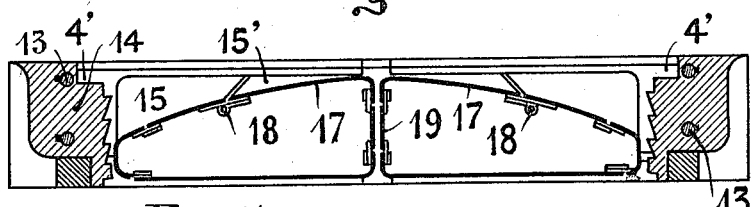
Figure 13:
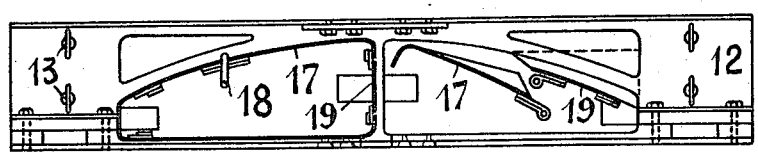
Figure 12:
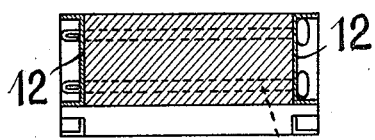
Figure 14:
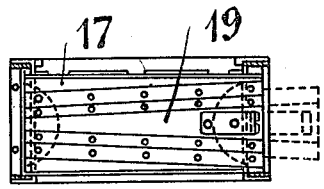
Figure 16:
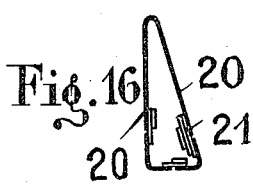
Figure 15:
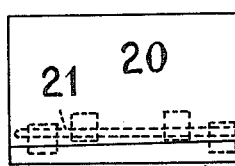

An embodiment of the invention is illustrated by way of example in the accompanying drawings, in which:

Figure 1 is a longitudinal section of the floor in accordance with this invention said section being made on line VII—VII of Fig. 2. Fig. 2 is a sectional plan thereof as seen from below with its ceiling removed; Fig. 3 is a plan; Fig. 4 is a cross section on the line I—I in Fig. 3; Fig. 5 is a similar section on the line II—II; Fig. 6 is a side view on a larger scale of an end of the block as constructed to rest upon a wall; Fig. 7 illustrates a modified form in side elevation; Figs. 8 and 9 are two sections on the line III—III of Fig. 7 and show two constructions in one of which the upper plate is reinforced by arc-shaped ribs and in the other by a continuous arch; Fig. 10 is a plan of the mold for the formation of the blocks illustrated in the preceding figures; Fig. 11 is a section on the line IV—IV in Fig. 10; Fig. 12 is a cross section thereof on the line V—V in Fig. 10; Fig. 13 is a side elevation of the mold; Fig. 14 is a cross section on the line VI—VI in Fig. 10 and Figs. 15 and 16 are front and side elevations of the core for forming the spaces in the ribs or arches.

As shown in Figs. 1 to 5, in all cases the floor is formed by laying side by side between two contiguous beams or girders, blocks of such length that their two extremities bear upon the girders and which can be manufactured on the spot by means of a mold hereinafter referred to. Each of these blocks is intended to occupy the entire space comprised between two contiguous girders and broadly they comprise two heads 1, 1, the outer face of each of which is provided with parallel flanges having the form of saw teeth for facilitating adherence, or they may be shaped as shown in Fig. 5 when the heads of the block are intended to rest upon the wall or with a notch 1', Fig. 6, when the block is to rest upon the lower flange of an iron girder. The two heads 1 are connected at their lower part by means of a continuous plate 2 intended to constitute the ceiling and between the heads, ribs 3 extend, their number depending upon the width of the block.

At its upper part each head comprises a flange 4 projecting outward and intended to rest upon the beam; this head is provided with perforations 5 which are preferably constituted by eyes formed at the extremity of the round iron reinforcing bars. Plates 6 are passed into these perforations which as shown in Fig. 1, in the case of a reinforced concrete beam (left hand end of Fig. 1) or in the case of an iron girder (right hand end) connect the blocks with the beams with the assistance of a concrete filling.

The block is completed by an upper plate 7 connecting the various ribs 3 and which by forming a continuous surface, can be utilized directly for the support of flooring bricks or tiles.

When the block is of a certain length, which may amount to as much as six feet, it can be reinforced by a vertical partition 8 preferably having the recessed form shown in Figs. 5 and 6 in such a manner that when all the blocks are in place, the two chambers defined by the partition 8 communicate with one another.

The upper plate (Figs. 4 and 5) has on each of its lateral edges a recess 9 to permit of jointing two contiguous blocks with mortar.

In order to increase the lightness of the blocks, the ribs 3 may have spaces as shown at $3^a$ in Figs. 7 and 8 or may be replaced by an arch $3'$ with spaces $3^b$ along its back (Fig. 9).

Whatever the form adopted, the block may be reinforced by a metal framework 10 extending from the projections 4, and passing into the heads 1 and extending through the whole of the lower plate 2 and possibly also the upper plate 7, the longitudinal irons of the framework corresponding to this upper plate or other separate irons having at their extremities eyes 11 surrounding the holes 5 of the projections 4. The metal reinforcing members also traverse the ribs 3 (Fig. 8) or the arch 3' (Fig. 9) and another reinforcing member connected with the reinforcements of the lower plate 2 and the upper plate 7 is incorporated in the partition 8.

The block can readily be formed by means of a mold broadly constituted (Figs. 10 to 13) by two lateral walls 12 of iron, or cast metal, connected by keys 13 passing through the heads 14, each of which heads has in its upper part a recess 4' for the formation of the projection 4 and has its inner wall serrated or otherwise shaped to the shape the heads of the blocks are to have.

The lateral walls 12 are open as shown in Fig. 13 to permit of the introduction into the mold of the blocks 14 having the shape of the spaces to be left between the ribs and to leave the spaces 16 for the formation of the ribs 3.

With a view to separating them, the molds are constituted of two elements 15 and 15' mounted upon a frame 17 constituted by a plurality of elements united by means of hooks or hinges and by a rod 18 passed through appropriate straps. Wedges 19 mounted in such a manner as to slide between two edges of the frame 17 corresponding with the wall flanking the partition 8, serve to cause the frame 17 to assume its normal shape with the blocks 15 or to permit of its contraction.

Figs. 10 to 13 illustrate the mold for a block comprising three ribs, but it will be understood that it might also serve to form blocks with one or two ribs, provided that the recess 16 corresponding to the rib that is to be omitted, is filled up in the mold.

By means of the core shown in Figs. 15 and 16 and constituted by elements 20 joined to one another and held together by the rod 21, it is possible to produce the apertures in the back of the ribs.

The lateral walls 12 and the head walls of the mold are preferably constituted in such a manner that they can be extended by means of lengthening pieces to serve for the formation of molds of different dimensions. In any case, after having arranged the two heads and a lateral wall of the mold in place, the framework constituting the metal reinforcement is introduced, whereupon the second lateral wall is fixed; in the lateral apertures of these walls the frames 17 are then introduced with the blocks 15 and the mold turned in such a manner that the part for forming the lower plate of the block is uppermost, the concrete is then poured in and the excess scraped off with a scraper. A plank is then fitted on this side of the mold, so that it can be turned over and concrete is then poured in, which, by filling the recesses 16 and so forth, forms the upper plate and the ribs, while at the same time completing the heads and the partition 8, the reinforcing means for which has been connected with the incorporated framework. When the concrete has set sufficiently, the mold is taken apart by first withdrawing the rods 18 and the wedges 19 so that the frame 17 can be removed and the block is completely finished.

This block constitutes an exceedingly light and strong element for forming a floor having a lower ceiling and a false ceiling, an air chamber being formed in its interior. The manner in which the blocks rest upon the beams provides a monolithic stable construction, which is perfectly smooth and sealed upon its upper and lower sides.

The invention is readily carried into practice and the cost is low particularly if the blocks are prepared on the work by means of the mold described.

What I claim as my invention and desire to secure by U. S. Letters Patent is:—

A hollow reinforced concrete block for constructing floors or roofings comprising, in combination, an upper plate-like wall; a lower plate-like wall; two heads, located at the ends of said walls; arch-shaped members springing laterally from said heads and disposed between the same, said members forming a support whereon said upper wall rests, and being free of direct contact with said lower wall; a framework of metal bars disposed in the body of the block; and projections on the outer faces of said heads, said bars being provided at their ends with eyes which are disposed within said projections, to permit two contiguous blocks to be connected together.

In testimony whereof I affix my signature in presence of two witnesses.

ROBERTO DI FILIPPO.

Witnesses:
 Nicolo Guoiun,
 Poellone Michele.

Copies of this patent may be obtained for five cents each, by addressing the "Commissioner of Patents, Washington, D. C."